(12) United States Patent
    Matsubayashi

(10) Patent No.: US 11,015,066 B2
(45) Date of Patent: May 25, 2021

(54) CONDUCTIVE POLYMER DISPERSION, CONDUCTIVE FILM AND METHOD OF MANUFACTURING THE SAME, AND ANTISTATIC CONTAINER AND METHOD OF MANUFACTURING THE SAME

(71) Applicant: Shin-Etsu Polymer Co., Ltd., Tokyo (JP)

(72) Inventor: Sou Matsubayashi, Kitaadachi-gun (JP)

(73) Assignee: SHIN-ETSU POLYMER CO., LTD., Tokyo (JP)

( * ) Notice: Subject to any disclaimer, the term of this patent is extended or adjusted under 35 U.S.C. 154(b) by 162 days.

(21) Appl. No.: 16/048,343

(22) Filed: Jul. 30, 2018

(65) Prior Publication Data

US 2019/0048210 A1     Feb. 14, 2019

(30) Foreign Application Priority Data

Aug. 8, 2017   (JP) .............................. JP2017-153567

(51) Int. Cl.
    *C09D 5/24* (2006.01)
    *H01B 1/12* (2006.01)
    (Continued)

(52) U.S. Cl.
    CPC ............... *C09D 5/24* (2013.01); *B65D 65/38* (2013.01); *C08J 7/0427* (2020.01); *C09D 5/02* (2013.01); *C09D 129/10* (2013.01); *C09D 133/06* (2013.01); *C09D 133/068* (2013.01); *C09D 167/00* (2013.01); *H01B 1/124* (2013.01);
    (Continued)

(58) Field of Classification Search
    CPC ........ C09D 5/24; C09D 133/068; C09D 5/02; C09D 129/10; C09D 133/06; C09D 167/00; C09D 165/00; C08J 7/0427; C08J 2323/12; C08J 2429/10; C08J 2433/06; C08J 2457/10; C08J 2467/00; C08J 2465/00; C08J 2425/18; C08J 2431/02; H01B 1/124; H01B 1/127; H01B 1/12; H01B 5/14; H01B 13/0026; B65D 65/38; C08L 2201/04; C08L 2205/03; C08L 2205/035; B05D 3/144; B29C 51/10; B29K 2031/04;
    (Continued)

(56) References Cited

U.S. PATENT DOCUMENTS 4,293,070 A * 10/1981 Ohlbach ................ B65D 81/18
                                                    206/709
5,709,714 A    1/1998 Natoli et al.
                (Continued)

FOREIGN PATENT DOCUMENTS

CN       1165864 A    11/1997
CN    103187115 A     7/2013
             (Continued)

OTHER PUBLICATIONS

Slinckx M, "VEOVA—A Versatile Monomer for the Production of High Performance Latex Binders", May 1, 1997, pp. 24-27, 29, Surface Coatings Australia, Melbourne, AU, 5pp.

*Primary Examiner* — James C Yager
(74) *Attorney, Agent, or Firm* — Hauptman Ham, LLP

(57) ABSTRACT

Provided is a conductive polymer dispersion, including: a conductive composite containing a π-conjugated conductive polymer and a polyanion; a vinyl versatate polymer; and a dispersion medium.

20 Claims, 1 Drawing Sheet

(51) Int. Cl.
  *C09D 133/06* (2006.01)
  *C09D 5/02* (2006.01)
  *C08J 7/04* (2020.01)
  *B65D 65/38* (2006.01)
  *C09D 129/10* (2006.01)
  *C09D 167/00* (2006.01)
  *B05D 3/14* (2006.01)
  *B29C 51/10* (2006.01)
  *B29K 31/00* (2006.01)
  *B29L 31/00* (2006.01)

(52) U.S. Cl.
  CPC .............. *H01B 1/127* (2013.01); *B05D 3/144* (2013.01); *B29C 51/10* (2013.01); *B29K 2031/04* (2013.01); *B29K 2995/0005* (2013.01); *B29L 2031/712* (2013.01); *C08J 2323/12* (2013.01); *C08J 2429/10* (2013.01); *C08J 2433/06* (2013.01); *C08J 2457/10* (2013.01); *C08J 2467/00* (2013.01); *Y10T 428/139* (2015.01); *Y10T 428/1352* (2015.01); *Y10T 428/1393* (2015.01)

(58) Field of Classification Search
  CPC ....... B29K 2995/0005; B29L 2031/712; Y10T 429/139; Y10T 428/1393; Y10T 428/1352
  See application file for complete search history.

(56) References Cited

U.S. PATENT DOCUMENTS

| | | |
|---|---|---|
| 2009/0116275 A1 | 5/2009 | Luc et al. |
| 2011/0135939 A1 | 6/2011 | Isaji et al. |
| 2016/0325352 A1 | 11/2016 | Alsayed et al. |

FOREIGN PATENT DOCUMENTS

| | | |
|---|---|---|
| CN | 104610487 A | 5/2015 |
| CN | 106478970 A | 3/2017 |
| JP | 2006-198805 A | 8/2006 |
| JP | 2007-284552 A | 11/2007 |
| JP | 2016-17115 A | 2/2016 |
| KR | 10-2014-0129206 A | 11/2014 |
| KR | 10-2017-0026157 A | 3/2017 |
| TW | 201435005 A | 9/2014 |
| WO | 2014085473 A1 | 6/2014 |
| WO | 2015/108001 A1 | 7/2015 |

* cited by examiner

CONDUCTIVE POLYMER DISPERSION, CONDUCTIVE FILM AND METHOD OF MANUFACTURING THE SAME, AND ANTISTATIC CONTAINER AND METHOD OF MANUFACTURING THE SAME

BACKGROUND

This disclosure relates to a conductive polymer dispersion containing a π-conjugated conductive polymer, a conductive film and a method of manufacturing the same, and an antistatic container and a method of manufacturing the same.

This application claims priority from Japanese Patent Application No. 2017-153567, filed on Aug. 8, 2017, the contents of which are incorporated herein by reference in their entirety.

A conductor obtained by forming a conductive layer on a surface of a plastic base material is used in applications in which antistatic properties are required, such as a package or container for an electronic part, and a package or container for food.

A π-conjugated conductive polymer is sometimes used as a conductive material to be contained in the conductive layer because the π-conjugated conductive polymer is excellent in conductivity and transparency, and besides, its conductivity is stable without depending on humidity.

As a method of forming the conductive layer containing the π-conjugated conductive polymer, there is given, for example, a method involving applying a conductive polymer dispersion, in which a conductive composite containing the π-conjugated conductive polymer and a polyanion is dispersed in water, to a base material, followed by drying (WO 2015/108001 A1).

In general, a plastic base material is hydrophobic, and has low hydrophilicity. Accordingly, the conductive layer formed by applying, to the plastic base material, the aqueous conductive polymer dispersion described in WO 2015/108001 A1 tends to have a low adhesive property for the base material. When a polyolefin, which has high hydrophobicity even among plastics, is used as the base material, the conductive layer formed from the aqueous conductive polymer dispersion has a particularly low adhesive property for the base material.

In addition, the conductive layer formed from the aqueous conductive polymer dispersion tends to have low water resistance owing to its high hydrophilicity, and hence is required to be improved in water resistance.

SUMMARY

An object of this disclosure is to provide a conductive polymer dispersion allowing easy formation of a conductive layer excellent in adhesive property for a plastic base material and in water resistance. Another object of this disclosure is to provide a conductive film including a conductive layer excellent in adhesive property for a plastic film base material and in water resistance and a method of manufacturing the same, and an antistatic container and a method of manufacturing the same.

This disclosure encompasses the following aspects.

[1] A conductive polymer dispersion, including: a conductive composite containing a π-conjugated conductive polymer and a polyanion; a vinyl versatate polymer; and a dispersion medium.

[2] A conductive polymer dispersion according to the aspect [1], wherein the vinyl versatate polymer contains a monomer unit derived from a vinyl versatate, and a monomer unit derived from vinyl acetate.

[3] A conductive polymer dispersion according to the aspect [1] or [2], wherein the vinyl versatate polymer has a pH, which is measured in conformity to JIS Z 8802:2011, of from 4 to 9.

[4] A conductive polymer dispersion according to any one of the aspects [1] to [3], wherein the dispersion medium contains water.

[5] A conductive polymer dispersion according to any one of the aspects [1] to [4], wherein the π-conjugated conductive polymer includes poly(3,4-ethylenedioxythiophene).

[6] A conductive polymer dispersion according to any one of the aspects [1] to [5], wherein the polyanion includes polystyrene sulfonic acid.

[7] A conductive polymer dispersion according to any one of the aspects [1] to [6], further including a binder component.

[8] A conductive polymer dispersion according to the aspect [7], wherein the binder component includes a polyester resin.

[9] A conductive polymer dispersion according to the aspect [7], wherein the binder component includes a glycidyl group-containing acrylic resin.

[10] A conductive film, including: a film base material; and a conductive layer, which is arranged on a surface of the film base material, and is formed from the conductive polymer dispersion of any one of the aspects [1] to [9].

[11] A conductive film according to the aspect [10], wherein the film base material contains a polyolefin-based resin.

[12] A conductive film according to the aspect [11], wherein the polyolefin-based resin includes a polypropylene resin.

[13] A method of manufacturing a conductive film, including applying the conductive polymer dispersion of any one of the aspects [1] to [9] to at least one surface of a film base material, followed by drying to form a conductive layer.

[14] A method of manufacturing a conductive film according to the aspect [13], wherein the film base material contains a polyolefin-based resin.

[15] A method of manufacturing a conductive film according to the aspect [14], wherein the polyolefin-based resin includes a polypropylene resin.

[16] A method of manufacturing a conductive film according to any one of the aspects [13] to [15], wherein the film base material has a hydrophilic group on a surface thereof.

[17] A method of manufacturing a conductive film according to the aspect [16], wherein the film base material is obtained by subjecting a surface of a film base material to corona discharge treatment.

[18] An antistatic container, including a formed product obtained by forming the conductive film of any one of the aspects [10] to [12] into a container shape.

[19] A method of manufacturing an antistatic container, including: manufacturing a conductive film by the method of manufacturing a conductive film of any one of the aspects [13] to [17]; and forming the conductive film into a container shape.

[20] A method of manufacturing an antistatic container according to the aspect [19], wherein the forming the conductive film includes subjecting the conductive film to vacuum forming.

According to the conductive polymer dispersion of this disclosure, the conductive layer excellent in adhesive property for a plastic base material and in water resistance can easily be formed.

The conductive film of this disclosure includes a conductive layer excellent in adhesive property for a plastic film base material and in water resistance.

According to the method of manufacturing a conductive film of this disclosure, the above-mentioned conductive film can easily be manufactured.

The antistatic container of this disclosure includes a conductive layer excellent in adhesive property for a plastic film base material and in water resistance.

According to the method of manufacturing an antistatic container of this disclosure, the above-mentioned antistatic container can easily be manufactured.

DESCRIPTION OF THE EMBODIMENTS

<Conductive Polymer Dispersion>

Figure 1:
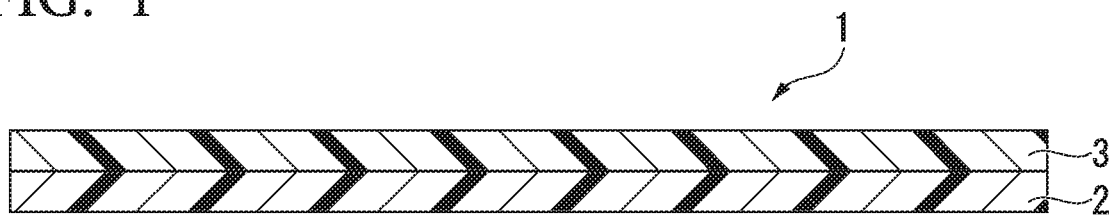
FIG. 1 is a cross-sectional view for illustrating an example of a conductive film of this disclosure.

A conductive polymer dispersion according to one aspect of this disclosure contains a conductive composite, a vinyl versatate polymer, and a dispersion medium.

(Conductive Composite)

The conductive composite in this aspect contains a π-conjugated conductive polymer and a polyanion having anion groups. The polyanion is coordinated to the π-conjugated conductive polymer, and the anion groups of the polyanion are doped into the π-conjugated conductive polymer. Thus, the conductive composite having conductivity is formed.

Not all the anion groups of the polyanion are doped into the π-conjugated conductive polymer, and the polyanion has an excess anion group. The excess anion group is a hydrophilic group, and hence the conductive composite has water dispersibility.

[π-Conjugated Conductive Polymer]

The π-conjugated conductive polymer may be any organic polymer having a main chain formed of a π-conjugated system without any particular limitation as long as the effects of this disclosure are provided. Examples thereof include a polypyrrole-based conductive polymer, a polythiophene-based conductive polymer, a polyacetylene-based conductive polymer, a polyphenylene-based conductive polymer, a polyphenylene vinylene-based conductive polymer, a polyaniline-based conductive polymer, a polyacene-based conductive polymer, a polythiophene vinylene-based conductive polymer, and copolymers thereof. From the viewpoint of stability in air, a polypyrrole-based conductive polymer, a polythiophene-based conductive polymer, and a polyaniline-based conductive polymer are preferred, and in terms of transparency, a polythiophene-based conductive polymer is more preferred.

Examples of the polythiophene-based conductive polymer include polythiophene, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butylenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), and poly(3-methyl-4-carboxybutylthiophene).

Examples of the polypyrrole-based conductive polymer include polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), and poly(3-methyl-4-hexyloxypyrrole).

Examples of the polyaniline-based conductive polymer include polyaniline, poly(2-methylaniline), poly(3-isobutylaniline), poly(2-anilinesulfonic acid), and poly(3-anilinesulfonic acid).

Of the π-conjugated conductive polymers, poly(3,4-ethylenedioxythiophene) is particularly preferred from the viewpoints of conductivity, transparency, and heat resistance.

The π-conjugated conductive polymers to be contained in the conductive composite may be used alone or in combination thereof.

[Polyanion]

The polyanion is a polymer having, in the molecule, two or more monomer units each having an anion group. The anion groups of the polyanion function as dopants for the π-conjugated conductive polymer to improve the conductivity of the π-conjugated conductive polymer.

The anion groups of the polyanion are each preferably a sulfonic acid group or a carboxy group.

Specific examples of such polyanion include: polymers each having a sulfonic acid group, such as polystyrene sulfonic acid, polyvinyl sulfonic acid, polyallyl sulfonic acid, polyacrylic sulfonic acid, polymethacrylic sulfonic acid, poly(2-acrylamido-2-methylpropanesulfonic acid), polyisoprene sulfonic acid, polysulfoethyl methacrylate, poly(4-sulfobutyl methacrylate), and polymethacryloxybenzenesulfonic acid; and polymers each having a carboxy group, such as polyvinyl carboxylic acid, polystyrene carboxylic acid, polyallyl carboxylic acid, polyacrylic carboxylic acid, polymethacrylic carboxylic acid, poly(2-acrylamido-2-methylpropanecarboxylic acid), polyisoprene carboxylic acid, and polyacrylic acid. The polyanion may be any one of those homopolymers, or may be a copolymer of two or more kinds thereof.

Of those polyanions, in order that the conductivity can be further enhanced, a polymer having a sulfonic acid group is preferred, and polystyrene sulfonic acid is more preferred.

The polyanions may be used alone or in combination thereof.

The mass-average molecular weight of the polyanion is preferably 20,000 or more and 1,000,000 or less, more preferably 100,000 or more and 500,000 or less. The mass-average molecular weight of the polyanion refers to a mass-based molecular weight determined on the basis of an elution time-versus-molecular weight calibration curve, which is obtained in advance from polystyrene standard substances having known molecular weights, through the measurement of an elution time using gel permeation chromatography (GPC).

The content ratio of the polyanion in the conductive composite falls within preferably the range of from 1 part by mass or more to 1,000 parts by mass or less, more preferably the range of from 10 parts by mass or more to 700 parts by mass or less, still more preferably the range of from 100 parts by mass or more to 500 parts by mass or less with respect to 100 parts by mass of the π-conjugated conductive polymer. When the content ratio of the polyanion is equal to or larger than the above-mentioned lower limit value, its doping effect on the π-conjugated conductive polymer tends to be stronger, leading to higher conductivity. Meanwhile, when the content of the polyanion is equal to or smaller than the above-mentioned upper limit value, a sufficient amount of the π-conjugated conductive polymer can be contained, and hence sufficient conductivity can be secured.

(Vinyl Versatate Polymer)

The vinyl versatate polymer is a homopolymer of a vinyl versatate, or a copolymer of the vinyl versatate and another monomer copolymerizable with the vinyl versatate. Herein, the vinyl versatate refers to a vinyl ester represented by the following chemical formula (1). The vinyl ester is a monomer having high hydrophobicity, and a polymer obtained by polymerization of the monomer also has high hydrophobicity.

In the following chemical formula (1), $R^1$ and $R^2$ each represent an alkyl group, and at least one of $R^1$ or $R^2$ represents an alkyl group having a branched structure. In addition, the sum of the carbon number of $R^1$ and the carbon number of $R^2$ is preferably 4 or more and 7 or less, more preferably 4 or more and 6 or less.

Examples of the alkyl group represented by each of the $R^1$ and the $R^2$ include a methyl group, an ethyl group, a n-propyl group, an isopropyl group, a n-butyl group, a tert-butyl group, a sec-butyl group, an isobutyl group, a n-pentyl group, an isopentyl group, a sec-pentyl group, a tert-pentyl group, a n-hexyl group, a 1,1-dimethylbutyl group, a 2-methylpentyl group, a 3-methylpentyl group, a 4-methylpentyl group, a 1-ethylbutyl group, a 2-ethylbutyl group, 3-ethylbutyl group, and a 1-methyl-1-ethylpropyl group.

Of the alkyl groups, the alkyl group having a branched structure is an isopropyl group (1-methylethyl group), a tert-butyl group (1,1-dimethylethyl group), a sec-butyl group (1-methylpropyl group), an isobutyl group (2-methylpropyl group), a tert-pentyl group (1,1-dimethylpropyl group), an isopentyl group (3-methylbutyl group), a sec-pentyl group (1-methylbutyl group), a 1,1-dimethylbutyl group, a 2-methylpentyl group, a 3-methylpentyl group, a 4-methylpentyl group, a 1-ethylbutyl group, a 2-ethylbutyl group, a 3-ethylbutyl group, or a 1-methyl-1-ethylpropyl group.

The vinyl versatate may be a mixture of compounds each represented by the chemical formula (1), the compounds having 9 or more and 11 or less carbon atoms in total.

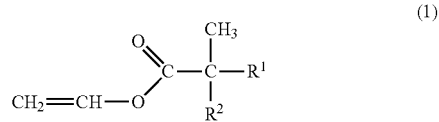

Examples of the other monomer copolymerizable with the vinyl versatate include vinyl acetate, vinyl alcohol, a (meth)acrylic acid alkyl ester, (meth)acrylic acid, an olefin, and (meth)acrylamide. Herein, "(meth)acryl" is a collective term for acryl and methacryl. The other monomers may be used alone or in combination thereof.

Of the other monomers, vinyl acetate, vinyl alcohol, a (meth)acrylic acid alkyl ester, (meth)acrylic acid, or an olefin is preferred because of the ease of copolymerization with the vinyl versatate, and further enhancement of the adhesive property of a conductive layer for a plastic base material and the water resistance of the conductive layer.

Examples of the (meth)acrylic acid alkyl ester include methyl (meth)acrylate, ethyl (meth)acrylate, propyl (meth)acrylate, butyl (meth)acrylate, 2-ethylhexyl (meth)acrylate, 2-methoxyethyl (meth)acrylate, and glycidyl (meth)acrylate.

Examples of the olefin include ethylene, propylene, and 1-butene.

Specific examples of the copolymer of the vinyl versatate and the other monomer copolymerizable with the vinyl versatate include a vinyl versatate-vinyl acetate copolymer, a vinyl versatate-vinyl acetate-(meth)acrylic acid alkyl ester copolymer, a vinyl versatate-(meth)acrylic acid alkyl ester copolymer, a vinyl versatate-(meth)acrylic acid alkyl ester-(meth)acrylic acid copolymer, and a vinyl versatate-ethylene-vinyl acetate copolymer.

In addition, the vinyl versatate polymer may further contain a monomer unit having an acid group. Examples of the acid group include a sulfonic acid group, a carboxy group, and a phosphoric acid group. When the vinyl versatate polymer contains the monomer unit having an acid group, and the conductive polymer dispersion contains a glycidyl group-containing acrylic resin, a reaction occurs between the vinyl versatate polymer and the glycidyl group-containing acrylic resin, and hence the water resistance and solvent resistance of the conductive layer are still further enhanced. In addition, when the vinyl versatate polymer contains the monomer unit having an acid group, and as described later, the plastic base material is subjected to hydrophilic treatment, the vinyl versatate is directly bonded to the surface of the plastic base material, and hence the adhesive strength of the conductive layer for the plastic base material is still further enhanced.

Examples of the monomer having an acid group include (meth)acrylic acid and crotonic acid as well as a monomer that is produced as a by-product in the synthesis of the vinyl versatate and has an acid group.

The vinyl versatate polymer sometimes contains, as an impurity, a carboxylic acid, such as the versatic acid or acetic acid. The carboxylic acid value of the vinyl versatate polymer is preferably from 5 mgKOH/g to 30 mgKOH/g, more preferably from 5 mgKOH/g to 20 mgKOH/g. Herein, the carboxylic acid value may be measured in conformity to JIS K 0070.

The content of the vinyl versatate unit in the vinyl versatate polymer is preferably 10 mass % or more and 100 mass % or less, more preferably 20 mass % or more and 90 mass % or less, still more preferably 30 mass % or more and 70 mass % or less with respect to the total mass of the vinyl versatate polymer. When the content of the vinyl versatate unit in the vinyl versatate polymer is equal to or larger than the above-mentioned lower limit value, the adhesive property of the conductive layer for the plastic base material and the water resistance are further enhanced. Meanwhile, when the content of the vinyl versatate unit in the vinyl versatate polymer is equal to or smaller than the above-mentioned upper limit value, dispersibility in the conductive polymer dispersion can be improved.

The glass transition temperature of the vinyl versatate polymer is preferably 10° C. or more and 100° C. or less, more preferably 20° C. or more and 80° C. or less. The glass transition temperature of the vinyl versatate polymer may be measured using a differential scanning calorimeter.

When the glass transition temperature of the vinyl versatate polymer is equal to or larger than the above-mentioned lower limit value, the water resistance and solvent resistance of the conductive layer can be further improved. When the glass transition temperature is equal to or smaller than the above-mentioned upper limit value, the adhesive property of the conductive layer for the plastic base material can be sufficiently improved.

The mass-average molecular weight of the vinyl versatate polymer is preferably 1,000 or more and 1,000,000 or less, more preferably 5,000 or more and 500,000 or less, still more preferably 10,000 or more and 100,000 or less. The mass-average molecular weight of the vinyl versatate polymer refers to a mass-based molecular weight determined on the basis of an elution time-versus-molecular weight calibration curve, which is obtained in advance from polystyrene standard substances having known molecular weights, through the measurement of an elution time using gel permeation chromatography (GPC).

When the mass-average molecular weight of the vinyl versatate polymer is equal to or larger than the above-mentioned lower limit value, the adhesive property of the conductive layer for the plastic base material can be sufficiently improved. When the mass-average molecular weight is equal to or smaller than the above-mentioned upper limit value, the dispersibility of the vinyl versatate polymer in the conductive polymer dispersion can be improved.

A persulfuric acid salt may be used as a polymerization initiator in the preparation of the vinyl versatate polymer. In that case, a water dispersion of the vinyl versatate polymer sometimes shows acidity owing to residual sulfate ions. When the water dispersion is acidic, sulfuric acid is preferably neutralized. When sulfuric acid is neutralized, the dispersibility of the vinyl versatate polymer in the conductive polymer dispersion can be improved. That is, the vinyl versatate polymer is preferably free of sulfuric acid as an impurity.

A pH measured for the vinyl versatate polymer in conformity to JIS Z 8802:2011 is preferably from 4 to 9, more preferably from 4.5 to 8.5. The pH is measured as described below.
1) 5 g of a sample is precisely weighed in the unit of 0.1 g.
2) 95 ml of distilled water is measured out in a 100 ml beaker using a graduated cylinder. A pH meter is placed in the beaker, and a rotor is placed therein. While the distilled water is stirred with a magnetic stirrer, its pH is adjusted by adding 0.01 mol/L hydrochloric acid or a 0.01 mol/L aqueous solution of sodium hydroxide so as to be stable at 7.0 at 23° C. 1 minute after being brought to rest.
3) The sample is added to the beaker containing the distilled water adjusted to pH 7.0 to provide a dispersion.
4) The dispersion is stirred with a magnetic stirrer for 5 minutes, the rotation is then stopped, and 1 minute later, the pH is read.

Sulfuric acid contained in the vinyl versatate polymer may be neutralized by adding an alkaline compound.

The alkaline compound may be an inorganic alkaline compound or an organic alkaline compound.

Examples of the inorganic alkaline compound include sodium hydroxide, potassium hydroxide, calcium hydroxide, ammonia, sodium hydrogen carbonate, potassium hydrogen carbonate, and ammonium hydrogen carbonate.

Examples of the organic alkaline compound include a primary amine, a secondary amine, a tertiary amine, a quaternary ammonium salt, and a nitrogen-containing aromatic cyclic compound.

Examples of the primary amine include aniline, toluidine, benzylamine, and ethanolamine.

Examples of the secondary amine include diethanolamine, dimethylamine, diethylamine, dipropylamine, diphenylamine, dibenzylamine, and dinaphthylamine.

Examples of the tertiary amine include triethanolamine, trimethylamine, triethylamine, tripropylamine, triphenylamine, tribenzylamine, and trinaphthylamine.

Examples of the quaternary ammonium salt include a tetramethylammonium salt, a tetraethylammonium salt, a tetrapropylammonium salt, a tetraphenylammonium salt, a tetrabenzylammonium salt, and a tetranaphthylammonium salt. As an anion serving as a counter ion for ammonium, there is given a hydroxide ion.

Examples of the nitrogen-containing aromatic cyclic compound include aniline, benzylamine, pyrrole, imidazole, 2-methylimidazole, 2-propylimidazole, N-methylimidazole, 1-(2-hydroxyethyl)imidazole, 2-ethyl-4-methylimidazole, 1,2-dimethylimidazole, 1-benzyl-2-methylimidazole, 1-cyanoethyl-2-methylimidazole, 1-cyanoethyl-2-ethyl-4-methylimidazole, 2-phenyl-4,5-dihydroxymethylimidazole, 1-acetylimidazole, 2-aminobenzimidazole, 2-amino-1-methylbenzimidazole, 2-hydroxybenzimidazole, 2-(2-pyridyl)benzimidazole, and pyridine.

The alkaline compounds may be used alone or in combination thereof.

The content of the vinyl versatate polymer in the conductive polymer dispersion is preferably 10 parts by mass or more and 100,000 parts by mass or less, more preferably 50 parts by mass or more and 50,000 parts by mass or less, still more preferably 100 parts by mass or more and 10,000 parts by mass or less with respect to 100 parts by mass of the conductive composite. When the content of the vinyl versatate polymer is equal to or larger than the above-mentioned lower limit value, the adhesive property of the conductive layer for the plastic base material can be further improved. When the content is equal to or smaller than the above-mentioned upper limit value, lowering of the conductivity due to a decrease in content of the conductive composite can be prevented.

(Binder Component)

As specific examples of a binder component, there are given binder resins, such as a polyester resin, an acrylic resin, an epoxy resin, an oxetane resin, a polyurethane resin, a polyimide resin, a melamine resin, a silicone resin, and a vinyl acetate resin.

In addition, the binder component may be a monomer or oligomer for forming any of the above-mentioned binder resins. The binder resin may be formed by polymerizing the monomer or the oligomer at the time of the formation of the conductive layer.

The binder components may be used alone or in combination thereof.

Of the binder components, a polyester resin is preferred because the water resistance of the conductive layer is further enhanced and its mechanical physical properties become satisfactory.

The polyester resin may have an acid group. The polyester resin having an acid group (hereinafter referred to as "polyester resin (1)") is a polyester resin that is a polycondensate of a dicarboxylic acid component and a diglycol component and that has an alkali metal salt of an acid group (e.g., a sulfonic acid group, a carboxy group, or a phosphoric acid group). The polyester resin (1) has large polarity, and hence is excellent in water dispersibility and can be stably dispersed in water without the use of an emulsifier or a stabilizer.

Examples of the dicarboxylic acid component include: aromatic dicarboxylic acids, such as phthalic acid, terephthalic acid, dimethyl terephthalate, isophthalic acid, dimethyl isophthalate, 2,5-dimethylterephthalic acid, 2,6-naphthalenedicarboxylic acid, biphenyldicarboxylic acid, and ortho-phthalic acid; aliphatic dicarboxylic acids, such as succinic acid, adipic acid, azelaic acid, sebacic acid, and dodecanedicarboxylic acid; and alicyclic dicarboxylic acids, such as cyclohexanedicarboxylic acid. The dicarboxylic acids may be used alone or in combination thereof.

The dicarboxylic acid component preferably contains a dicarboxylic acid having a sulfonic acid alkali metal salt-type substituent ($-SO_3^- X^+$, where X represents an alkali metal ion), in which a sulfonic acid group is neutralized with an alkali metal.

The dicarboxylic acid having a sulfonic acid alkali metal salt-type substituent is a compound obtained by converting a sulfonic acid group in a dicarboxylic acid having a sulfonic acid group to an alkali metal salt.

Examples of the dicarboxylic acid having a sulfonic acid group include sulfoterephthalic acid, 5-sulfoisophthalic acid, 4-sulfoisophthalic acid, 4-sulfonaphthalene-2,7-dicarboxylic acid, and derivatives thereof. Examples of the alkali metal include sodium and potassium.

The dicarboxylic acid having a sulfonic acid alkali metal salt-type substituent is preferably a sodium salt of 5-sulfoisophthalic acid or a derivative thereof.

Among the dicarboxylic acid components, as a dicarboxylic acid component other than the dicarboxylic acid having a sulfonic acid alkali metal salt-type substituent, an aromatic dicarboxylic acid is preferred, and terephthalic acid or isophthalic acid is more preferred. The aromatic nucleus of the aromatic dicarboxylic acid has high compatibility with a hydrophobic plastic, and is also excellent in hydrolysis resistance.

The content ratio of the dicarboxylic acid having a sulfonic acid alkali metal salt-type substituent is preferably 6 mol % or more and 20 mol % or less, more preferably 10 mol % or more and 18 mol % or less in all the dicarboxylic acid components. When the content ratio of the dicarboxylic acid having a sulfonic acid alkali metal salt-type substituent is equal to or larger than the above-mentioned lower limit value, lowering of the solvent resistance of the conductive layer can be suppressed. When the content ratio is equal to or smaller than the above-mentioned upper limit value, the water resistance of the conductive layer is further enhanced.

Examples of the diglycol component for forming the polyester resin (1) include diethylene glycol, an aliphatic glycol having 2 or more and 8 or less carbon atoms, and an alicyclic glycol having 6 or more and 12 or less carbon atoms. Specific examples of the aliphatic glycol having 2 or more and 8 or less carbon atoms and the alicyclic glycol having 6 or more and 12 or less carbon atoms include ethylene glycol, 1,3-propanediol, 1,2-propylene glycol, neopentyl glycol, 1,4-butanediol, 1,4-cyclohexanedimethanol, 1,3-cyclohexanedimethanol, 1,2-cyclohexanedimethanol, 1,6-hexanediol, p-xylylene glycol, and triethylene glycol. The diglycol components may be used alone or in combination thereof.

The diglycol component preferably contains diethylene glycol in order to further improve the water resistance and the solvent resistance.

The number-average molecular weight of the polyester resin (1) is preferably 2,000 or more and 30,000 or less, more preferably 2,500 or more and 25,000 or less. The number-average molecular weight of the polyester resin (1) refers to a number-based molecular weight determined on the basis of an elution time-versus-molecular weight calibration curve, which is obtained in advance from polystyrene standard substances having known molecular weights, through the measurement of an elution time using gel permeation chromatography (GPC).

When the number-average molecular weight of the polyester resin (1) is equal to or larger than the above-mentioned lower limit value, the water resistance of the polyester resin (1) is further enhanced. When the number-average molecular weight is equal to or smaller than the above-mentioned upper limit value, the water dispersibility of the polyester resin (1) is further enhanced.

A method of producing the polyester resin (1) is not particularly limited, and an example thereof is a method involving subjecting the dicarboxylic acid component and the diglycol component to an esterification or transesterification reaction at 130° C. or more and 200° C. or less, followed by a polycondensation reaction at 200° C. or more and 250° C. or less under a reduced pressure condition. As a reaction catalyst to be used in the method of producing the polyester resin (1), there are given, for example, acetic acid metal salts, such as zinc acetate and manganese acetate, metal oxides, such as antimony oxide and germanium oxide, and titanium compounds.

The obtained polyester resin (1) may be turned to a water dispersion by being added to water. The water dispersion of the polyester resin (1) preferably has a polyester solid content concentration of 30 mass % or less because a high solid content concentration makes it difficult to obtain a uniform dispersion.

In addition, the binder component is preferably a glycidyl group-containing acrylic resin from the viewpoint of improving the solvent resistance of the conductive layer as well as its water resistance.

The water resistance and the solvent resistance are improved presumably because a cross-linked structure is formed in the conductive layer when the glycidyl group-containing acrylic resin is contained as the binder component.

In addition, when the glycidyl group-containing acrylic resin is contained as the binder component, the adhesive property of the conductive layer for the plastic base material can be further enhanced. Although the reason for this has yet to be elucidated, it is presumed that the glycidyl group-containing acrylic resin intervenes between the plastic base material and the polyanion contained in the conductive composite, to thereby fix the polyanion, which is hydrophilic, to the plastic base material, which is hydrophobic.

Presumably because of the foregoing, the adhesive property of the conductive layer formed from the aqueous conductive polymer dispersion for the plastic base material is improved.

Particularly when a plastic base material whose surface has been subjected to hydrophilic treatment is used, the glycidyl group-containing acrylic resin easily reacts with a hydrophilic group (e.g. a hydroxy group or a carboxy group) generated on the surface of the plastic base material. Probably because of the foregoing, the adhesive property for the plastic base material is further enhanced.

The glycidyl group-containing acrylic resin is a homopolymer formed only of a glycidyl group-containing radically polymerizable unsaturated monomer unit, or a copolymer having a glycidyl group-containing radically polymerizable unsaturated monomer unit and another radically polymerizable unsaturated monomer unit copolymerizable with the foregoing monomer.

The glycidyl group-containing acrylic resins may be used alone or in combination thereof.

Examples of the glycidyl group-containing radically polymerizable unsaturated monomer include glycidyl acrylate, glycidyl methacrylate, and glycidyl ethers, such as allyl glycidyl ether. Of those, glycidyl methacrylate is preferred. The glycidyl group-containing radically polymerizable unsaturated monomers may be used alone or in combination thereof.

The content ratio of the glycidyl group-containing radically polymerizable unsaturated monomer unit in the glycidyl group-containing acrylic resin is preferably 10 mass % or more and 100 mass % or less, more preferably 20 mass % or more and 100 mass % or less with respect to 100 mass % of all the monomer units. When the content ratio of the glycidyl group-containing radically polymerizable unsaturated monomer unit in the glycidyl group-containing acrylic resin is 10 mass % or more, the water resistance and solvent resistance of the conductive layer formed from the conductive polymer dispersion according to this aspect can be further improved.

Examples of the other radically polymerizable unsaturated monomer copolymerizable with the glycidyl group-containing radically polymerizable unsaturated monomer include vinyl esters, unsaturated carboxylic acid esters (such as an acrylic acid alkyl ester and a methacrylic acid alkyl ester), unsaturated carboxylic acid amides (such as an acrylic acid amide and a methacrylic acid amide), unsaturated nitriles (such as acrylonitrile), unsaturated carboxylic acids (such as acrylic acid and methacrylic acid), and olefin monomers. The other radically polymerizable unsaturated monomers may be used alone or in combination thereof.

An unsaturated carboxylic acid monomer, such as acrylic acid or methacrylic acid, is preferably used as the other radically polymerizable unsaturated monomer because the water resistance is further enhanced.

The content ratio of the unsaturated carboxylic acid monomer unit in the glycidyl group-containing acrylic resin is preferably 5 mass % or more and 20 mass % or less with respect to 100 mass % of all the monomer units. When the content ratio of the unsaturated carboxylic acid monomer unit in the glycidyl group-containing acrylic resin is equal to or larger than the above-mentioned lower limit value, the water resistance and solvent resistance of the conductive layer can be further improved. When the content ratio is equal to or smaller than the above-mentioned upper limit value, lowering of storage stability due to the gelation of liquid over time can be suppressed.

A method of producing the glycidyl group-containing acrylic resin is not particularly limited, and for example, the glycidyl group-containing acrylic resin may be produced by emulsion polymerization.

In the production of the glycidyl group-containing acrylic resin by the emulsion polymerization, for example, a reaction vessel is loaded with ion-exchanged water, a polymerization initiator, and a surfactant, and then a dropping vessel is loaded with ion-exchanged water and a surfactant and monomers are put thereinto to prepare a monomer emulsion, followed by dropwise addition of the monomer emulsion to the reaction vessel, to thereby cause emulsion radical polymerization. A reaction temperature is preferably set to 60° C. or more and 100° C. or less, and a reaction time is preferably set to 4 hours or more and 10 hours or less. As the surfactant to be used for the emulsion polymerization, one kind or two or more kinds of an anionic surfactant, a nonionic reactive surfactant, and a nonionic non-reactive surfactant may be used.

Examples of the polymerization initiator to be used for the emulsion polymerization include commonly used radical polymerization initiators, including potassium persulfate, ammonium persulfate, water-soluble peroxides, such as hydrogen peroxide, oil-soluble peroxides, such as benzoyl peroxide and t-butyl hydroperoxide, and azo compounds, such as azobisisobutyronitrile.

When the glycidyl group-containing acrylic resin is produced by the emulsion polymerization, the glycidyl group-containing acrylic resin is obtained as an emulsion.

The content of the binder component in the conductive polymer dispersion is preferably 100 parts by mass or more and 10,000 parts by mass or less, more preferably 100 parts by mass or more and 5,000 parts by mass or less, still more preferably 100 parts by mass or more and 1,000 parts by mass or less with respect to 100 parts by mass of the conductive composite. When the content of the binder component is equal to or larger than the above-mentioned lower limit value, the strength of the conductive layer can be improved. When the content is equal to or smaller than the above-mentioned upper limit value, lowering of the conductivity due to a decrease in content of the conductive composite can be prevented.

(Dispersion Medium)

Examples of the dispersion medium to be used in this aspect include water, an organic solvent, and a mixed liquid of water and an organic solvent.

Examples of the organic solvent include an alcohol-based solvent, an ether-based solvent, a ketone-based solvent, an ester-based solvent, and an aromatic hydrocarbon-based solvent.

Examples of the alcohol-based solvent include methanol, ethanol, 1-propanol, 2-propanol, 2-methyl-2-propanol, 1-butanol, 2-butanol, 2-methyl-1-propanol, allyl alcohol, propylene glycol monomethyl ether, and ethylene glycol monomethyl ether.

Examples of the ether-based solvent include diethyl ether, dimethyl ether, ethylene glycol, propylene glycol, and a propylene glycol dialkyl ether.

Examples of the ketone-based solvent include diethyl ketone, methyl propyl ketone, methyl butyl ketone, methyl isopropyl ketone, methyl isobutyl ketone, methyl amyl ketone, diisopropyl ketone, methyl ethyl ketone, acetone, and diacetone alcohol.

Examples of the ester-based solvent include ethyl acetate, propyl acetate, and butyl acetate.

Examples of the aromatic hydrocarbon-based solvent include benzene, toluene, xylene, ethylbenzene, propylbenzene, and isopropylbenzene.

The organic solvents may be used alone or in combination thereof.

Of the organic solvents, methanol is preferred because the dispersibility of each of the conductive composite and the vinyl versatate polymer can be further enhanced.

As described later, the conductive composite is obtained as a water dispersion, and hence, also in the conductive polymer dispersion, the dispersion medium preferably contains water. The content ratio of water with respect to the total mass of the entire dispersion medium contained in the conductive polymer dispersion is preferably 50 mass % or more and 100 mass % or less, more preferably 80 mass % or more and 100 mass % or less, still more preferably 90 mass % or more and 100 mass % or less. The dispersion medium may be entirely water.

(Conductivity Improver)

The conductive polymer dispersion may contain a conductivity improver in order to further improve the conductivity.

Herein, the above-mentioned π-conjugated conductive polymer, polyanion, vinyl versatate polymer, and binder component are not classified as conductivity improvers.

The conductivity improver is preferably at least one kind of compound selected from the group consisting of saccharides, a nitrogen-containing aromatic cyclic compound, a compound having two or more hydroxy groups, a compound having one or more hydroxy groups and one or more carboxy groups, a compound having an amide group, a compound having an imide group, a lactam compound, and a compound having a glycidyl group.

The conductive polymer dispersion may contain one kind or two or more kinds of the conductivity improvers.

The content ratio of the conductivity improver in the conductive polymer dispersion is preferably 1 part by mass or more and 10,000 parts by mass or less, more preferably 10 parts by mass or more and 5,000 parts by mass or less, still more preferably 100 parts by mass or more and 2,500 parts by mass or less with respect to 100 parts by mass of the conductive composite. When the content ratio of the conductivity improver is equal to or larger than the above-mentioned lower limit value, the conductivity-improving effect of the addition of the conductivity improver is sufficiently exhibited. When the content ratio is equal to or smaller than the above-mentioned upper limit value, lowering of the conductivity resulting from lowering of the concentration of the π-conjugated conductive polymer can be prevented.

(Other Additive)

The conductive polymer dispersion may contain any other known additive.

As the additive, which is not particularly limited as long as the effects of this disclosure are obtained, for example, a surfactant, an inorganic conductive agent, a defoamer, a coupling agent, an antioxidant, or a UV absorber may be used. The additive is formed of a compound other than the above-mentioned π-conjugated conductive polymer, polyanion, vinyl versatate polymer, binder component, and conductivity improver.

Examples of the surfactant include nonionic, anionic, and cationic surfactants. Of those, a nonionic surfactant is preferred in terms of storage stability. In addition, a polymer-based surfactant, such as polyvinylpyrrolidone, may be added.

Examples of the inorganic conductive agent include metal ions and conductive carbon. The metal ions may each be generated by dissolving a metal salt in water.

Examples of the defoamer include a silicone resin, polydimethylsiloxane, and a silicone oil.

Examples of the coupling agent include silane coupling agents each having an epoxy group, a vinyl group, or an amino group.

Examples of the antioxidant include a phenol-based antioxidant, an amine-based antioxidant, a phosphorus-based antioxidant, a sulfur-based antioxidant, and saccharides.

Examples of the UV absorber include a benzotriazole-based UV absorber, a benzophenone-based UV absorber, a salicylate-based UV absorber, a cyanoacrylate-based UV absorber, an oxanilide-based UV absorber, a hindered amine-based UV absorber, and a benzoate-based UV absorber.

When the conductive polymer dispersion contains the additive, its content ratio is appropriately determined depending on the kind of the additive, and may fall within the range of, for example, from 0.001 part by mass or more to 5 parts by mass or less with respect to 100 parts by mass of the conductive composite.

(Method of Producing Conductive Polymer Dispersion)

As a method of producing the conductive polymer dispersion according to this aspect, there is given, for example, a method involving subjecting a monomer for forming the π-conjugated conductive polymer to chemical oxidative polymerization in an aqueous solution of the polyanion to prepare a water dispersion of the conductive composite, and adding the vinyl versatate polymer to the water dispersion. When the binder component, the conductivity improver, other additives, and the like are to be contained in the conductive polymer dispersion, it is appropriate to add those components to the water dispersion.

In addition, a commercially available product may be used as the water dispersion of the conductive composite.

The vinyl versatate polymer has high hydrophobicity, and hence, when added as it is, has low dispersibility in the conductive polymer dispersion. Therefore, the vinyl versatate is preferably turned to an emulsion in advance of being added in order to enhance the dispersibility in the conductive polymer dispersion.

A known catalyst may be applied to the chemical oxidative polymerization. For example, a catalyst and an oxidant may be used. Examples of the catalyst include transition metal compounds, such as ferric chloride, ferric sulfate, ferric nitrate, and cupric chloride. Examples of the oxidant include persulfuric acid salts, such as ammonium persulfate, sodium persulfate, and potassium persulfate. The oxidant can return a reduced catalyst to its original oxidation state.

The content of the conductive composite in the conductive polymer water dispersion is preferably 0.1 mass % or more and 10 mass % or less, more preferably 0.3 mass % or more and 5 mass % or less, still more preferably 0.5 mass % or more and 4 mass % or less with respect to the total mass of the conductive polymer dispersion.

(Action and Effect)

The conductive polymer dispersion according to this aspect contains the conductive composite containing the π-conjugated conductive polymer and the polyanion, and hence a layer formed from the conductive polymer dispersion serves as a conductive layer having conductivity.

Hitherto, a surfactant has been sometimes used to impart conductivity to the surface of a plastic base material.

Particularly when conductivity is imparted to a polyolefin-based resin base material having high hydrophobicity, the conductivity has often been imparted using the surfactant. However, the conductivity obtained using the surfactant has high humidity dependence, and the conductivity tends to lower under a low-humidity environment. In contrast, in this aspect, in which conductivity is expressed using the π-conjugated conductive polymer, the conductivity has no humidity dependence, and stable conductivity can be exhibited.

A related-art conductive polymer dispersion containing a π-conjugated conductive polymer is often an aqueous dispersion because of its production method, and hence has low wettability to the plastic base material. Accordingly, a conductive layer formed from the conductive polymer dispersion has a low adhesive property for the plastic base material, and in particular, has a particularly low adhesive property for a base material formed of a polyolefin-based resin. In addition, the conductive layer formed from the aqueous conductive polymer dispersion has low water resistance.

However, the conductive polymer dispersion according to this aspect contains the vinyl versatate polymer, and hence is improved in wettability to the plastic base material. Accordingly, the adhesive property of the conductive layer to be formed for the plastic base material can be improved. The conductive layer formed from the conductive polymer dispersion according to this aspect has a high adhesive property even for the polyolefin-based resin base material having particularly high hydrophobicity. Presumably because the vinyl versatate polymer has an alkyl group having high hydrophobicity and has high compatibility for the plastic base material, the wettability to the plastic base material, in particular, the polyolefin-based resin base material is improved to improve the adhesive property of the conductive layer. In addition, it is presumed that the vinyl versatate polymer has high compatibility with the conductive composite.

In addition, the vinyl versatate polymer has high hydrophobicity, and hence can improve the water resistance of the conductive layer formed from the conductive polymer dispersion according to this aspect.

Therefore, according to the conductive polymer dispersion according to this aspect, a conductive layer excellent in adhesive property for the plastic base material and in water resistance can easily be formed.

It is presumed that, particularly when the vinyl versatate polymer has a monomer unit having an acid group, and the plastic base material is subjected to hydrophilic treatment, the anion groups of the polyanion serve as a catalyst to allow the vinyl versatate polymer and the plastic base material to react with each other to be bonded to each other. When the vinyl versatate polymer and the plastic base material are bonded to each other, the adhesive property of the conductive layer for the plastic base material and the water resistance of the conductive layer are still further enhanced.

The conductive polymer dispersion according to this aspect is mainly applied to a film base material as described later, but may be applied to a plastic base material having a solid shape other than the film base material.

<Conductive Film>

FIG. 1 is a cross-sectional view for illustrating an example of a conductive film of this disclosure.

A conductive film 1 according to one aspect of this disclosure includes a film base material 2, and a conductive layer 3 arranged on at least one surface of the film base material 2 and formed from the conductive polymer dispersion.

The conductive film according to this aspect may be used as it is as a packaging material, or as described later, may be used as a forming material for an antistatic container. In the packaging material formed of the conductive film according to this aspect, the conductive layer functions as an antistatic layer, and hence, for example, adhesion of dust can be prevented. Accordingly, the appearance of a packaged product (e.g., food) can be prevented from being impaired by adhesion of dust to the packaging material.

The film base material includes a plastic film base material.

A resin for the film base material for forming the plastic film is, for example, a polyolefin-based resin, an ethylene-vinyl acetate copolymer resin, an ethylene-methyl methacrylate copolymer resin, polystyrene, polyvinyl chloride, polyvinyl alcohol, polyethylene terephthalate, polybutylene terephthalate, polyethylene naphthalate, polyacrylate, polycarbonate, polyvinylidene fluoride, polyarylate, a styrene-based elastomer, a polyester-based elastomer, polyethersulfone, polyetherimide, polyether ether ketone, polyphenylene sulfide, polyimide, cellulose triacetate, or cellulose acetate propionate. Examples of the polyolefin-based resin include polyethylene, polypropylene, an ethylene-α-olefin copolymer resin, and a propylene-α-olefin copolymer resin.

This aspect is suitable in the case of using a polyolefin-based resin film having higher hydrophobicity even among plastic films, in particular, a polypropylene film. In this aspect, the adhesive property of the conductive layer even for a film base material having particularly high hydrophobicity can be enhanced.

In addition, the film base material may be unstretched, or may be stretched.

In addition, a hydrophilic group, such as a carboxy group or a hydroxy group, may be formed on the surface of the film base material by hydrophilic treatment to be described later.

The average thickness of the film base material is preferably 10 μm or more and 500 μm or less, more preferably 20 μm or more and 200 μm or less. When the average thickness of the film base material is equal to or larger than the above-mentioned lower limit value, breakage is less liable to occur. When the average thickness is equal to or smaller than the above-mentioned upper limit value, sufficient flexibility as a film can be secured.

Herein, the thickness of a member is a value obtained by measuring thicknesses at ten random sites with a micrometer, and averaging the measured values.

The conductive layer in this aspect contains a conductive composite containing a π-conjugated conductive polymer and a polyanion, and a vinyl versatate polymer.

When the conductive polymer dispersion to be used in the manufacture of the conductive film contains a binder component, the conductive layer contains a binder resin.

The average thickness of the conductive layer is preferably 10 nm or more and 20,000 nm or less, more preferably 20 nm or more and 10,000 nm or less, still more preferably 30 nm or more and 5,000 nm or less. When the average thickness of the conductive layer is equal to or larger than the above-mentioned lower limit value, sufficiently high conductivity can be exhibited. When the average thickness of the conductive layer is equal to or smaller than the above-mentioned upper limit value, the conductive layer can easily be formed.

The surface resistance value of the conductive layer measured under the condition of an applied voltage of 10 V using a resistivity meter (Hiresta manufactured by Mitsubishi Chemical Analytech Co., Ltd.) is preferably from $5.0\times10^5 \Omega/\square$ to $5.0\times10^9 \Omega/\square$. $\Omega/\square$ means $\Omega$/sq.

The conductive film according to this aspect may be manufactured by applying the conductive polymer dispersion to at least one surface of the film base material, followed by drying to form the conductive layer.

Before the application of the conductive polymer dispersion, the film base material is preferably subjected to hydrophilic treatment, such as corona discharge treatment, plasma treatment, or flame treatment, to form a hydrophilic group (e.g., a hydroxy group, a carboxy group, or a carbonyl group) on the surface of the film base material. When the film base material is subjected to the hydrophilic treatment, the adhesive property of the conductive layer can be still further improved. Of the hydrophilic treatments, corona discharge treatment is preferred because the surface of the film base material can simply be hydrophilized.

As a method of applying the conductive polymer dispersion to the film base material, for example, there may be applied: an application method involving using a coater, such as a slit coater, a spray coater, a gravure coater, a roll coater, a curtain flow coater, a spin coater, a bar coater, a reverse coater, a kiss coater, a fountain coater, a rod coater, an air doctor coater, a knife coater, a blade coater, a cast coater, or a screen coater; or an immersion method, such as dipping.

As a method for the drying after the application of the conductive polymer dispersion, there are given heat drying, vacuum drying, and the like. When the conductive polymer dispersion contains at least one of the polyester resin (1) or the glycidyl group-containing acrylic resin, heat drying is preferably performed from the viewpoint of promoting reaction. A general method, such as hot-air heating or infrared heating, may be adopted as the heat drying.

When the heat drying is applied, a heating temperature is appropriately set depending on the dispersion medium to be used, but falls within the range of generally from 50° C. or more to 150° C. or less, preferably from 60° C. or more to 130° C. or less, more preferably from 70° C. or more to 120° C. or less. In this case, the heating temperature is the set temperature of a dryer.

In addition, from the viewpoint of sufficiently removing the dispersion medium, a drying time is preferably 5 minutes or more.

<Antistatic Container>

Figure 2:
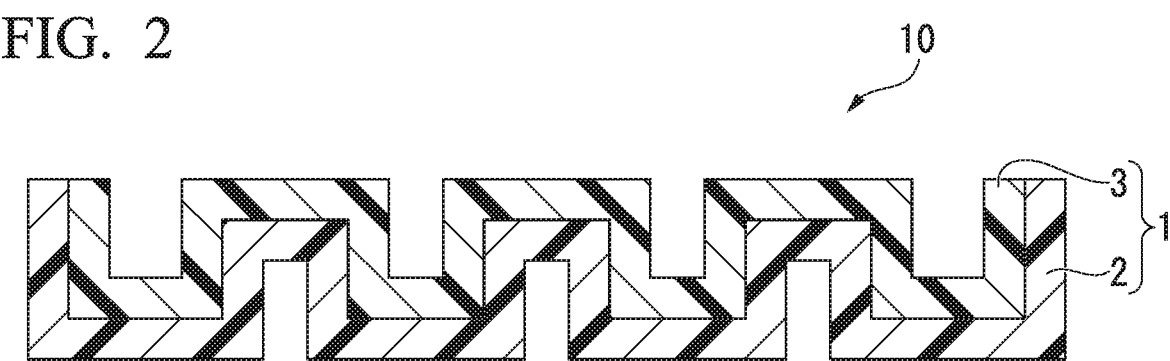
FIG. 2 is a cross-sectional view for illustrating an example of an antistatic container of this disclosure.

FIG. 2 is a cross-sectional view for illustrating an example of an antistatic container of this disclosure.

An antistatic container 10 according to one aspect of this disclosure includes a formed product of the conductive film 1. The antistatic container according to this aspect exhibits an antistatic property by means of the conductive layer containing the conductive composite.

The shape of the antistatic container according to this aspect is not particularly limited, and only needs to be such that a space capable of accommodating an article to be transported or stored is formed. The article to be accommodated in the antistatic container according to this aspect is suitably a part having a risk of being broken by discharge of static electricity, such as an electronic part. An example of the antistatic container for accommodating the electronic part is a tape-shaped or sheet-shaped container having formed therein a plurality of recesses for accommodating electronic parts. Examples of the electronic part include an IC, an LSI, and a capacitor.

The antistatic container is manufactured by forming the conductive film into a container shape. As a forming method, for example, a vacuum forming method, a pressure forming method, or a press forming method may be applied. Of those forming methods, a vacuum forming method is preferred from the viewpoint that a recess for accommodating an article can be formed easily and at low cost.

The conditions of vacuum forming are adjusted to conditions under which a desired recess is easily formed. Examples of the vacuum forming conditions include a forming temperature and a degree of vacuum.

The forming temperature is set to preferably more than 110° C., more preferably 120° C. or more and 180° C. or less. Herein, the forming temperature refers to the surface temperature of the conductive film at the time of its forming. When the forming temperature is set to more than 110° C., the conductive film can easily be formed. Meanwhile, when the forming temperature is set to be equal to or smaller than the above-mentioned upper limit value, thermal degradation of the conductive film at the time of its forming can be prevented.

EXAMPLES

Production Example 1

206 g of sodium styrene sulfonate was dissolved in 1,000 ml of ion-exchanged water. While the solution was stirred at 80° C., an oxidant solution of 1.14 g of ammonium persulfate dissolved in advance in 10 ml of water was added dropwise over 20 minutes. The resultant solution was stirred for 12 hours.

To the resultant sodium styrene sulfonate-containing solution, 1,000 ml of sulfuric acid diluted to 10 mass % was added, and about 1,000 ml of the solution was removed from the polystyrene sulfonic acid-containing solution by an ultrafiltration method. 2,000 ml of ion-exchanged water was added to the remaining liquid, and about 2,000 ml of the solution was removed by the ultrafiltration method. The above-mentioned ultrafiltration operation was repeated three times. Further, about 2,000 ml of ion-exchanged water was added to the resultant polystyrene sulfonic acid-containing solution, and about 2,000 ml of the solution was removed by the ultrafiltration method. This ultrafiltration operation was repeated three times.

Water in the resultant solution was removed under reduced pressure to provide polystyrene sulfonic acid as a colorless solid.

(Production Example 2)

14.2 g of 3,4-ethylenedioxythiophene, and a solution of 36.7 g of polystyrene sulfonic acid in 2,000 ml of ion-exchanged water were mixed with each other at 20° C.

While the thus obtained mixed solution was kept at 20° C. and stirred, an oxidation catalyst solution of 29.64 g of ammonium persulfate and 8.0 g of ferric sulfate in 200 ml of ion-exchanged water was slowly added, and the mixture was subjected to a reaction under stirring for 3 hours.

2,000 ml of ion-exchanged water was added to the resultant reaction liquid, and about 2,000 ml of the solution was removed by the ultrafiltration method. This operation was repeated three times.

Then, to the resultant solution, 200 ml of sulfuric acid diluted to 10 mass % and 2,000 ml of ion-exchanged water were added, and about 2,000 ml of the solution was removed by the ultrafiltration method. 2,000 ml of ion-exchanged water was added to the resultant, and about 2,000 ml of the solution was removed by the ultrafiltration method. This operation was repeated three times.

Further, 2,000 ml of ion-exchanged water was added to the resultant solution, and about 2,000 ml of the solution was removed by the ultrafiltration method. This operation was repeated five times to provide a solution of poly(3,4-ethylenedioxythiophene) doped with 1.2% of polystyrene sulfonic acid (PEDOT-PSS water dispersion). The content of PSS with respect to the PEDOT-PSS solid content is 75 mass %.

Production Example 3

A beaker was loaded with 18 parts by mass of ion-exchanged water and 3 parts by mass of an anionic surfactant (manufactured by Sanyo Chemical Industries, Ltd., ELEMINOL RS-3000, active component: 50 mass %). After that, while the contents in the beaker were stirred, 40 parts by mass of glycidyl methacrylate was put thereinto to prepare a monomer emulsion.

Then, a four-necked flask with a condenser, a monomer dropping funnel, a thermometer, and a stirrer was loaded with 37.5 parts by mass of ion-exchanged water, 1 part by mass of an anionic surfactant (manufactured by Sanyo Chemical Industries, Ltd., ELEMINOL RS-3000), and 0.5 part by mass of potassium persulfate. After that, while the contents in the flask were stirred, nitrogen purging was performed, and heating was started. After a liquid temperature of 75° C. had been reached, the monomer emulsion was added dropwise over 4 hours. The liquid temperature was kept in the range of from 75° C. or more to 85° C. or less even after the completion of the dropwise addition to allow the reaction to proceed, and was decreased 4 hours after the completion of the dropwise addition. After the cooling, ion-exchanged water was further added to provide a glycidyl group-containing acrylic resin water dispersion having a non-volatile content of 25 mass %.

Example 1

25 g of water and 50 g of a vinyl versatate-vinyl acetate copolymer emulsion (manufactured by Showa Denko K.K., Polysol OLX-7879, solid content concentration: 46 mass %, pH 1.7, glass transition temperature: 0° C., mass-average molecular weight: 200,000 or more and 500,000 or less, carboxylic acid value: 15 mgKOH/g, represented as "Polysol OLX-7879" in Table 1) were added to 25 g of the PEDOT-PSS water dispersion obtained in Production Example 2, and were mixed therewith to provide a conductive polymer dispersion.

The resultant conductive polymer dispersion was applied using a No. 4 bar coater onto a polypropylene film whose surface had been subjected to corona treatment, and was dried at 85° C. for 1 minute to form a conductive layer. Thus, a conductive film was obtained.

Example 2

A conductive polymer dispersion was obtained in the same manner as in Example 1 except that the vinyl versatate-vinyl acetate copolymer emulsion (manufactured by Showa Denko K.K., Polysol OLX-7879) was changed to a vinyl versatate-vinyl acetate copolymer emulsion (manufactured by Showa Denko K.K., Polysol OLX-7879 neutralized product, solid content concentration: 46 mass %, pH 6.2, neutralizer: ammonia, glass transition temperature: 0° C., mass-average molecular weight: 200,000 or more and 500,000 or less, carboxylic acid value: 15 mgKOH/g, represented as "Neutralized Polysol OLX-7879" in Table 1). With the use of the resultant conductive polymer dispersion, a conductive film was obtained in the same manner as in Example 1.

Example 3

A conductive polymer dispersion was obtained in the same manner as in Example 1 except that the vinyl versatate-vinyl acetate copolymer emulsion (manufactured by Showa Denko K.K., Polysol OLX-7879) was changed to a vinyl versatate-vinyl acetate copolymer emulsion (manufactured by Showa Denko K.K., Polysol OLX-7878, pH 1.8, glass transition temperature: 60° C., mass-average molecular weight: 200,000 or more and 500,000 or less, carboxylic acid value: 15 mgKOH/g, solid content concentration: 46 mass %, represented as "Polysol OLX-7878" in Table 1). With the use of the resultant conductive polymer dispersion, a conductive film was obtained in the same manner as in Example 1.

Example 4

A conductive polymer dispersion was obtained in the same manner as in Example 1 except that the vinyl versatate-vinyl acetate copolymer emulsion (manufactured by Showa Denko K.K., Polysol OLX-7879) was changed to a vinyl versatate-vinyl acetate copolymer emulsion (manufactured by Showa Denko K.K., Polysol OLX-7878 neutralized product, pH 5.9, neutralizer: ammonia, glass transition temperature: 60° C., mass-average molecular weight: 200,000 or more and 500,000 or less, carboxylic acid value: 15 mgKOH/g, solid content concentration: 46 mass %, represented as "Neutralized Polysol OLX-7878" in Table 1). With the use of the resultant conductive polymer dispersion, a conductive film was obtained in the same manner as in Example 1.

Example 5

A conductive polymer dispersion was obtained in the same manner as in Example 1 except that the amount of the vinyl versatate-vinyl acetate copolymer emulsion (manufactured by Showa Denko K.K., Polysol OLX-7879) was changed to 5 g, and 45 g of a polyester aqueous solution (Goo Chemical Co., Ltd., PLAS COAT Z-690, solid content concentration: 25 mass %) was further added. With the use of the resultant conductive polymer dispersion, a conductive film was obtained in the same manner as in Example 1.

Example 6

A conductive polymer dispersion was obtained in the same manner as in Example 5 except that the vinyl versatate-vinyl acetate copolymer emulsion (manufactured by Showa Denko K.K., Polysol OLX-7879) was changed to a vinyl versatate-vinyl acetate copolymer emulsion (manufactured by Showa Denko K.K., Polysol OLX-7879 neutralized product). With the use of the resultant conductive polymer dispersion, a conductive film was obtained in the same manner as in Example 1.

Example 7

A conductive polymer dispersion was obtained in the same manner as in Example 5 except that the vinyl versatate-vinyl acetate copolymer emulsion (manufactured by Showa Denko K.K., Polysol OLX-7879) was changed to a vinyl versatate-vinyl acetate copolymer emulsion (manufactured by Showa Denko K.K., Polysol OLX-7878). With the use of the resultant conductive polymer dispersion, a conductive film was obtained in the same manner as in Example 1.

Example 8

A conductive polymer dispersion was obtained in the same manner as in Example 5 except that the vinyl versatate-vinyl acetate copolymer emulsion (manufactured by Showa Denko K.K., Polysol OLX-7879) was changed to a vinyl versatate-vinyl acetate copolymer emulsion (manufactured by Showa Denko K.K., Polysol OLX-7878 neutralized product). With the use of the resultant conductive polymer dispersion, a conductive film was obtained in the same manner as in Example 1.

Example 9

A conductive polymer dispersion was obtained in the same manner as in Example 7 except that the polyester aqueous solution (Goo Chemical Co., Ltd., PLAS COAT Z-690, solid content concentration: 25 mass %) was changed to a polyester aqueous solution (Goo Chemical Co., Ltd., PLAS COAT RZ-105, solid content concentration: 25 mass %). With the use of the resultant conductive polymer dispersion, a conductive film was obtained in the same manner as in Example 1.

Example 10

A conductive polymer dispersion was obtained in the same manner as in Example 7 except that the polyester aqueous solution (Goo Chemical Co., Ltd., PLAS COAT Z-690, solid content concentration: 25 mass %) was changed to a water-dispersed co-polyester aqueous solution (Toyobo Co., Ltd., VYLONAL 1245, solid content concentration: 30 mass %). With the use of the resultant conductive polymer dispersion, a conductive film was obtained in the same manner as in Example 1.

Example 11

A conductive polymer dispersion was obtained in the same manner as in Example 1 except that the amount of the vinyl versatate-vinyl acetate copolymer emulsion (manufactured by Showa Denko K.K., Polysol OLX-7879) was changed to 5 g, and 45 g of a mixed liquid of a glycidyl group-containing acrylic resin and a polyester resin (manufactured by Takamatsu Oil & Fat Co., Ltd., PESRESIN A-647GEX, water dispersion, solid content concentration: 20 mass %) was further added. With the use of the resultant conductive polymer dispersion, a conductive film was obtained in the same manner as in Example 1.

Example 12

A conductive polymer dispersion was obtained in the same manner as in Example 11 except that the vinyl versatate-vinyl acetate copolymer emulsion (manufactured by Showa Denko K.K., Polysol OLX-7879) was changed to a vinyl versatate-vinyl acetate copolymer emulsion (manufactured by Showa Denko K.K., Polysol OLX-7879 neutralized product). With the use of the resultant conductive polymer dispersion, a conductive film was obtained in the same manner as in Example 1.

Example 13

A conductive polymer dispersion was obtained in the same manner as in Example 11 except that the vinyl versatate-vinyl acetate copolymer emulsion (manufactured by Showa Denko K.K., Polysol OLX-7879) was changed to a vinyl versatate-vinyl acetate copolymer emulsion (manufactured by Showa Denko K.K., Polysol OLX-7878). With the use of the resultant conductive polymer dispersion, a conductive film was obtained in the same manner as in Example 1.

Example 14

A conductive polymer dispersion was obtained in the same manner as in Example 11 except that the vinyl versatate-vinyl acetate copolymer emulsion (manufactured by Showa Denko K.K., Polysol OLX-7879) was changed to a vinyl versatate-vinyl acetate copolymer emulsion (manufactured by Showa Denko K.K., Polysol OLX-7878 neutralized product). With the use of the resultant conductive polymer dispersion, a conductive film was obtained in the same manner as in Example 1.

Example 15

A conductive polymer dispersion was obtained in the same manner as in Example 1 except that the amount of the vinyl versatate-vinyl acetate copolymer emulsion (manufactured by Showa Denko K.K., Polysol OLX-7879) was changed to 5 g, and 45 g of the glycidyl group-containing acrylic resin water dispersion obtained in Production Example 3 was further added. With the use of the resultant conductive polymer dispersion, a conductive film was obtained in the same manner as in Example 1.

Example 16

A conductive polymer dispersion was obtained in the same manner as in Example 15 except that the vinyl versatate-vinyl acetate copolymer emulsion (manufactured by Showa Denko K.K., Polysol OLX-7879) was changed to a vinyl versatate-vinyl acetate copolymer emulsion (manufactured by Showa Denko K.K., Polysol OLX-7879 neutralized product). With the use of the resultant conductive polymer dispersion, a conductive film was obtained in the same manner as in Example 1.

Example 17

A conductive polymer dispersion was obtained in the same manner as in Example 15 except that the vinyl versatate-vinyl acetate copolymer emulsion (manufactured by Showa Denko K.K., Polysol OLX-7879) was changed to a vinyl versatate-vinyl acetate copolymer emulsion (manufactured by Showa Denko K.K., Polysol OLX-7878). With the use of the resultant conductive polymer dispersion, a conductive film was obtained in the same manner as in Example 1.

Example 18

A conductive polymer dispersion was obtained in the same manner as in Example 15 except that the vinyl versatate-vinyl acetate copolymer emulsion (manufactured by Showa Denko K.K., Polysol OLX-7879) was changed to a vinyl versatate-vinyl acetate copolymer emulsion (manufactured by Showa Denko K.K., Polysol OLX-7878 neutralized product). With the use of the resultant conductive polymer dispersion, a conductive film was obtained in the same manner as in Example 1.

Example 19

A conductive polymer dispersion was obtained in the same manner as in Example 1 except that the amount of the vinyl versatate-vinyl acetate copolymer emulsion (manufactured by Showa Denko K.K., Polysol OLX-7879) was changed to 10 g, and 40 g of the glycidyl group-containing acrylic resin water dispersion obtained in Production Example 3 was further added. With the use of the resultant conductive polymer dispersion, a conductive film was obtained in the same manner as in Example 1.

Example 20

A conductive polymer dispersion was obtained in the same manner as in Example 19 except that the vinyl versatate-vinyl acetate copolymer emulsion (manufactured by Showa Denko K.K., Polysol OLX-7879) was changed to a vinyl versatate-vinyl acetate copolymer emulsion (manufactured by Showa Denko K.K., Polysol OLX-7879 neutralized product). With the use of the resultant conductive polymer dispersion, a conductive film was obtained in the same manner as in Example 1.

Example 21

A conductive polymer dispersion was obtained in the same manner as in Example 19 except that the vinyl versatate-vinyl acetate copolymer emulsion (manufactured by Showa Denko K.K., Polysol OLX-7879) was changed to a vinyl versatate-vinyl acetate copolymer emulsion (manufactured by Showa Denko K.K., Polysol OLX-7878). With the use of the resultant conductive polymer dispersion, a conductive film was obtained in the same manner as in Example 1.

Example 22

A conductive polymer dispersion was obtained in the same manner as in Example 19 except that the vinyl versatate-vinyl acetate copolymer emulsion (manufactured by Showa Denko K.K., Polysol OLX-7879) was changed to a vinyl versatate-vinyl acetate copolymer emulsion (manufactured by Showa Denko K.K., Polysol OLX-7878 neutralized product). With the use of the resultant conductive polymer dispersion, a conductive film was obtained in the same manner as in Example 1.

Comparative Example 1

A conductive polymer dispersion was obtained in the same manner as in Example 1 except that 50 g of the vinyl versatate-vinyl acetate copolymer emulsion (manufactured by Showa Denko K.K., Polysol OLX-7879) was not added to 25 g of the PEDOT-PSS water dispersion, and instead, the addition amount of water was increased to 75 g. With the use of the resultant conductive polymer dispersion, a conductive film was obtained in the same manner as in Example 1.

Comparative Example 2

A conductive polymer dispersion was obtained in the same manner as in Example 1 except that 50 g of the vinyl versatate-vinyl acetate copolymer emulsion (manufactured by Showa Denko K.K., Polysol OLX-7879) was not added, and instead, 50 g of a polyester aqueous solution (Goo Chemical Co., Ltd., PLAS COAT Z-690) was added. With the use of the resultant conductive polymer dispersion, a conductive film was obtained in the same manner as in Example 1.

Comparative Example 3

A conductive polymer dispersion was obtained in the same manner as in Example 1 except that 50 g of the vinyl versatate-vinyl acetate copolymer emulsion (manufactured by Showa Denko K.K., Polysol OLX-7879) was not added, and instead, 50 g of a polyester aqueous solution (Goo Chemical Co., Ltd., PLAS COAT RZ-105) was added. With the use of the resultant conductive polymer dispersion, a conductive film was obtained in the same manner as in Example 1.

Comparative Example 4

A conductive polymer dispersion was obtained in the same manner as in Example 1 except that 50 g of the vinyl versatate-vinyl acetate copolymer emulsion (manufactured by Showa Denko K.K., Polysol OLX-7879) was not added, and instead, 50 g of a water-dispersed co-polyester aqueous solution (Toyobo Co., Ltd., VYLONAL 1245) was added. With the use of the resultant conductive polymer dispersion, a conductive film was obtained in the same manner as in Example 1.

Comparative Example 5

A conductive polymer dispersion was obtained in the same manner as in Example 1 except that 50 g of the vinyl versatate-vinyl acetate copolymer emulsion (manufactured by Showa Denko K.K., Polysol OLX-7879) was not added, and instead, 50 g of a mixed liquid of a glycidyl group-containing acrylic resin and a polyester resin (manufactured by Takamatsu Oil & Fat Co., Ltd., PESRESIN A-647GEX) was added. With the use of the resultant conductive polymer dispersion, a conductive film was obtained in the same manner as in Example 1.

Comparative Example 6

A conductive polymer dispersion was obtained in the same manner as in Example 1 except that 50 g of the vinyl versatate-vinyl acetate copolymer emulsion (manufactured by Showa Denko K.K., Polysol OLX-7879) was not added, and instead, 50 g of the glycidyl group-containing acrylic resin obtained in Production Example 3 was added. With the use of the resultant conductive polymer dispersion, a conductive film was obtained in the same manner as in Example 1.

<Evaluation>

[Surface Resistance Value]

A surface resistance value was measured for the conductive layer of the conductive film of each example under the condition of an applied voltage of 10 V using a resistivity meter (Hiresta manufactured by Mitsubishi Chemical Analytech Co., Ltd.). The measurement results of surface resistance values are shown in Tables 1 and 2.

[Adhesive Property]

A cellophane tape was attached to the surface of the conductive layer of the conductive film of each example, and then the cellophane tape was peeled off. The presence or absence of peeling of the conductive layer in this case was visually observed, and its adhesive property was evaluated by the following criteria. The evaluation results are shown in Tables 1 and 2.

A: Peeling of the conductive layer does not occur, and the adhesive property is high.

B: Peeling of the conductive layer occurs, and the adhesive property is low.

[Water Resistance]

The surface of the conductive layer of the conductive film of each example was rubbed back and forth 10 times with a nonwoven fabric impregnated with water at a pressure of 100 g/cm$^2$. The presence or absence of peeling of the conductive layer in this case was visually observed, and its water resistance was evaluated by the following criteria. The evaluation results are shown in Tables 1 and 2.

A: Peeling of the conductive layer does not occur, and the water resistance is high.

B: A plurality of flaws are caused on the conductive layer, and the water resistance is slightly low.

C: Peeling of the conductive layer occurs, and the water resistance is low.

[Solvent Resistance]

The surface of the conductive layer of the conductive film of each example was rubbed back and forth 10 times with a nonwoven fabric impregnated with isopropanol at a pressure of 100 g/cm$^2$. The presence or absence of peeling of the conductive layer in this case was visually observed, and its solvent resistance was evaluated by the following criteria. The evaluation results are shown in Tables 1 and 2.

A: Peeling of the conductive layer does not occur, and the solvent resistance is high.

B: A plurality of flaws are caused on the conductive layer, and the solvent resistance is slightly low.

C: Peeling of the conductive layer occurs, and the solvent resistance is low.

TABLE 1

| Example No. | Binder component Kind | Amount (g) | Vinyl versatate polymer Kind | Amount (g) | Surface resistance value (Ω/□) | Adhesive property | Water resistance | Solvent resistance |
|---|---|---|---|---|---|---|---|---|
| 1 | — | 0 | Polysol OLX-7879 | 50 | $1.0 \times 10^6$ | A | B | C |
| 2 | | | Neutralized Polysol OLX-7879 | | $9.0 \times 10^6$ | A | B | C |
| 3 | | | Polysol OLX-7878 | | $7.0 \times 10^6$ | A | B | C |
| 4 | | | Neutralized Polysol OLX-7878 | | $5.0 \times 10^6$ | A | B | C |
| 5 | PLAS COAT Z-690 | 45 | Polysol OLX-7879 | 5 | $5.4 \times 10^6$ | A | A | C |
| 6 | | | Neutralized Polysol OLX-7879 | | $2.9 \times 10^8$ | A | A | C |
| 7 | | | Polysol OLX-7878 | | $2.0 \times 10^6$ | A | A | C |
| 8 | | | Neutralized Polysol OLX-7878 | | $2.0 \times 10^6$ | A | A | C |
| 9 | PLAS COAT RZ-105 | 45 | Polysol OLX-7878 | 5 | $3.0 \times 10^7$ | A | A | C |
| 10 | VYLONAL 1245 | 45 | Polysol OLX-7878 | 5 | $9.0 \times 10^6$ | A | A | C |
| 11 | PESRESIN A-647GEX | 45 | Polysol OLX-7879 | 5 | $2.0 \times 10^6$ | A | A | A |
| 12 | | | Neutralized Polysol OLX-7879 | | $5.0 \times 10^6$ | A | A | A |
| 13 | | | Polysol OLX-7878 | | $2.0 \times 10^7$ | A | A | A |
| 14 | | | Neutralized Polysol OLX-7878 | | $6.0 \times 10^6$ | A | A | A |
| 15 | Production Example 3 | 45 | Polysol OLX-7879 | 5 | $2.0 \times 10^8$ | A | A | A |
| 16 | | | Neutralized Polysol OLX-7879 | | $3.0 \times 10^8$ | A | A | A |
| 17 | | | Polysol OLX-7878 | | $4.0 \times 10^8$ | A | A | A |
| 18 | | | Neutralized Polysol OLX-7878 | | $2.0 \times 10^8$ | A | A | A |
| 19 | | 40 | Polysol OLX-7879 | 10 | $5.0 \times 10^8$ | A | A | A |
| 20 | | | Neutralized Polysol OLX-7879 | | $4.0 \times 10^8$ | A | A | A |
| 21 | | | Polysol OLX-7878 | | $2.0 \times 10^8$ | A | A | A |

TABLE 1-continued

| Example No. | Binder component Kind | Amount (g) | Vinyl versatate polymer Kind | Amount (g) | Surface resistance value ($\Omega/\square$) | Adhesive property | Water resistance | Solvent resistance |
|---|---|---|---|---|---|---|---|---|
| 22 | | | Neutralized Polysol OLX-7878 | | $2.0 \times 10^8$ | A | A | A |
| 23 | PESRESIN A-647GEX | 45 | Polysol OLX-7878 | 5 | $5.0 \times 10^9$ | A | A | A |

TABLE 2

| Comparative Example No. | Binder component Kind | Amount (g) | Vinyl versatate polymer Kind | Amount (g) | Surface resistance value ($\Omega/\square$) | Adhesive property | Water resistance | Solvent resistance |
|---|---|---|---|---|---|---|---|---|
| 1 | — | 0 | — | 0 | $5.0 \times 10^3$ | B | C | C |
| 2 | PLAS COAT Z-690 | 50 | | | $2.0 \times 10^5$ | B | C | C |
| 3 | PLAS COAT RZ-105 | | | | $2.0 \times 10^6$ | B | C | C |
| 4 | VYLONAL 1245 | | | | $2.0 \times 10^8$ | B | C | C |
| 5 | PESRESIN A-647GEX | | | | $3.0 \times 10^8$ | B | C | C |
| 6 | Production Example 3 | | | | $2.0 \times 10^8$ | B | C | C |

In each of Examples 1 to 22, in which the conductive layer was formed from the conductive polymer dispersion containing the conductive composite and the vinyl versatate-vinyl acetate copolymer, the surface resistance value of the conductive layer was small, and the conductivity was high. In addition, in each of the conductive films of Examples 1 to 22, the adhesive property of the conductive layer for the film base material was high, and the water resistance of the conductive layer was also high.

Of the Examples, each of Examples 11 to 22, in which the conductive layer was formed from the conductive polymer dispersion further containing the glycidyl group-containing acrylic resin, was also excellent in solvent resistance of the conductive layer.

In contrast, in each of Comparative Examples 1 to 6, in which the conductive layer was formed from the conductive polymer dispersion containing the conductive composite but not containing the vinyl versatate polymer, both the adhesive property of the conductive layer for the film base material and the water resistance of the conductive layer were low. In addition, in each of the conductive films of Comparative Examples 1 to 6, the solvent resistance of the conductive layer was low.

In each of Comparative Examples 2 to 6, although the conductive polymer dispersion contained the binder component, the adhesive property and water resistance of the conductive layer were low. Thus, it is found that the addition of the binder component to the conductive composite does not improve the adhesive property and water resistance of the conductive layer, but the addition of the vinyl versatate polymer improves the adhesive property and water resistance of the conductive layer.

Example 23

The conductive film of Example 13 was subjected to vacuum forming using a vacuum forming machine including an upper die and a lower die having a recess. Specifically, under a state in which the upper die and the lower die were opened, the conductive film was placed between the upper die and the lower die, and was heated with a heater of the upper die while the surface temperature of the film was measured.

After the surface temperature of the film had reached 150° C., the lower die was raised toward the upper die to be pressed against the conductive film. Under this state, vacuuming was performed from a lower die side, and the vacuumed state was kept for 20 seconds. After that, the film was cooled to 40° C., and the lower die was lowered to remove the formed product.

The formed product has a cylindrical recess having a circular opening with a diameter of 100 mm and having a depth of 30 mm. In addition, the stretching ratio in the vacuum forming was set to 3 times.

The formed product obtained by the vacuum forming was also measured for its surface resistance value, and evaluated for the adhesive property, water resistance, and solvent resistance of its conductive layer. The results are shown in Table 1.

The obtained formed product was at a high level in terms of all of the following: conductivity, adhesive property of the conductive layer for the film base material, and water resistance and solvent resistance of the conductive layer. Such formed product can be suitably used as an antistatic container for accommodating an electronic part or the like.

What is claimed is:
1. A conductive polymer dispersion, comprising:
 a conductive composite containing a π-conjugated conductive polymer and a polyanion;
 a vinyl versatate polymer; and
 a dispersion medium, wherein
 the vinyl versatate polymer has a vinyl versatate monomer unit, and is free of a monomer unit comprising ethylene.

2. The conductive polymer dispersion according to claim 1, wherein the vinyl versatate polymer contains a monomer unit derived from a vinyl versatate, and a monomer unit derived from vinyl acetate.

3. The conductive polymer dispersion according to claim 1, wherein the vinyl versatate polymer has a pH, which is measured in conformity to JIS Z 8802:2011, of from 4 to 9.

4. The conductive polymer dispersion according to claim 1, wherein the dispersion medium contains water.

5. The conductive polymer dispersion according to claim 1, wherein the π-conjugated conductive polymer comprises poly(3,4-ethylenedioxythiophene).

6. The conductive polymer dispersion according to claim 1, wherein the polyanion comprises polystyrene sulfonic acid.

7. The conductive polymer dispersion according to claim 1, further comprising a binder component.

8. The conductive polymer dispersion according to claim 7, wherein the binder component comprises a polyester resin.

9. The conductive polymer dispersion according to claim 7, wherein the binder component comprises a glycidyl group-containing acrylic resin.

10. A conductive film, comprising:
a film base material; and
a conductive layer, which is arranged on a surface of the film base material, and is formed from the conductive polymer dispersion of claim 1.

11. The conductive film according to claim 10, wherein the film base material contains a polyolefin-based resin.

12. The conductive film according to claim 11, wherein the polyolefin-based resin comprises a polypropylene resin.

13. A method of manufacturing a conductive film, comprising applying the conductive polymer dispersion of claim 1 to at least one surface of a film base material, followed by drying to form a conductive layer.

14. A method of manufacturing a conductive film according to claim 13, wherein the film base material contains a polyolefin-based resin.

15. A method of manufacturing a conductive film according to claim 14, wherein the polyolefin based resin comprises a polypropylene resin.

16. A method of manufacturing a conductive film according to claim 13, wherein the film base material has a hydrophilic group on a surface thereof.

17. A method of manufacturing a conductive film according to claim 16, wherein the film base material is obtained by subjecting a surface of a film base material to corona discharge treatment.

18. An antistatic container, comprising a formed product obtained by forming the conductive film of claim 10 into a container shape.

19. A method of manufacturing an antistatic container, comprising:
manufacturing a conductive film by the method of manufacturing a conductive film of claim 13; and
forming the conductive film into a container shape.

20. A method of manufacturing an antistatic container according to claim 19, wherein the forming the conductive film comprises subjecting the conductive film to vacuum forming.

* * * * *